(12) United States Patent
Wang et al.

(10) Patent No.: US 10,436,639 B2
(45) Date of Patent: Oct. 8, 2019

(54) SPECTROMETER AND OPTICAL INPUT PORTION THEREOF

(71) Applicant: OTO PHOTONICS INC., Hsinchu (TW)

(72) Inventors: Meng-Hua Wang, Hsinchu (TW); Kuei Wu Chang, Hsinchu (TW); Chang Cheng Chou, Hsinchu (TW); Chien-Hsiang Hung, Hsinchu (TW); Jan Liang Yeh, Hsinchu (TW)

(73) Assignee: OTO PHOTONICS INC., Hsinchu (TW)

( * ) Notice: Subject to any disclaimer, the term of this patent is extended or adjusted under 35 U.S.C. 154(b) by 63 days.

(21) Appl. No.: 15/546,003

(22) PCT Filed: Jan. 23, 2015

(86) PCT No.: PCT/CN2015/071392
§ 371 (c)(1),
(2) Date: Jul. 24, 2017

(87) PCT Pub. No.: WO2016/115720
PCT Pub. Date: Jul. 28, 2016

(65) Prior Publication Data
US 2017/0363470 A1 Dec. 21, 2017

(51) Int. Cl.
*G01J 3/02* (2006.01)
*G01J 3/20* (2006.01)

(52) U.S. Cl.
CPC ........... *G01J 3/0243* (2013.01); *G01J 3/0202* (2013.01); *G01J 3/024* (2013.01); *G01J 3/0256* (2013.01); *G01J 3/0291* (2013.01); *G01J 3/20* (2013.01)

(58) Field of Classification Search
CPC .................................................... G01J 3/0243
(Continued)

(56) References Cited

U.S. PATENT DOCUMENTS 5,404,218 A * 4/1995 Nave ............... G01N 21/65
356/246
5,452,085 A * 9/1995 Fancy ............... G01J 3/02
356/326

(Continued)

FOREIGN PATENT DOCUMENTS

CN 2526832 Y 12/2002
CN 102706830 A 10/2012
(Continued)

*Primary Examiner* — Kara E. Geisel
*Assistant Examiner* — Omar H Nixon
(74) *Attorney, Agent, or Firm* — Cheng-Ju Chiang

(57) ABSTRACT

A spectrometer (100) and an optical input portion (32) thereof are disclosed. The optical input portion (32) comprises an assembly structure (322), and the assembly structure (322) is formed at a hole wall (321) of a through hole (3211) of the optical input portion (32). A light (L1) is incident into a dispersing element (2) of the spectrometer (100) along an optical path (13) after passing through the through hole (3211), and is dispersed by the dispersing element (2). The assembly structure (322) is used to be detachably assembled with an optical element (200). When the optical element (200) is assembled with the assembly structure (322), an optical axis of the optical element (200) is linked to the optical path (13). As a result, the light (L1) passing through the optical element (200) is incident to the dispersing element (2) along the optical axis and the optical path (13).

20 Claims, 14 Drawing Sheets

(58) Field of Classification Search
USPC .......................................................... 356/326
See application file for complete search history.

(56) References Cited

U.S. PATENT DOCUMENTS

| | | | |
|---|---|---|---|
| 6,263,133 B1 | 7/2001 | Hamm | |
| 6,303,934 B1* | 10/2001 | Daly | G01J 3/02 250/339.02 |
| 6,381,008 B1* | 4/2002 | Branagh | G01J 3/18 356/328 |
| 6,606,156 B1* | 8/2003 | Ehbets | G01J 3/02 356/328 |
| 6,897,951 B2* | 5/2005 | Womble | G01N 21/276 356/301 |
| 2010/0012830 A1* | 1/2010 | Cristoni | H01J 49/04 250/282 |
| 2010/0014081 A1* | 1/2010 | Huening | G01J 3/02 356/328 |
| 2013/0294727 A1* | 11/2013 | Ko | G01J 3/02 385/37 |
| 2014/0002820 A1* | 1/2014 | Ko | G01J 3/0256 356/328 |
| 2014/0192209 A1* | 7/2014 | Yin | G09G 3/006 348/191 |

FOREIGN PATENT DOCUMENTS

| | | |
|---|---|---|
| CN | 101285915 B | 4/2013 |
| CN | 103512659 A | 1/2014 |
| CN | 103822708 A | 5/2014 |
| CN | 204064458 U | 12/2014 |
| DE | 19836595 A1 | 2/2000 |
| TW | M336444 U | 7/2008 |
| TW | 201416648 A | 5/2014 |
| WO | 2011/134156 A1 | 11/2011 |

* cited by examiner

SPECTROMETER AND OPTICAL INPUT PORTION THEREOF

BACKGROUND OF THE INVENTION

1. Field of the Invention

The present invention relates to an optical device, and in particular, to a spectrometer and an optical input portion thereof.

2. The Related Arts

A spectrometer is an optical instrument capable of dispersing lights according to wavelengths thereof. Usually, the spectrometer can be additionally equipped with optical elements, such as a fiber, a collimating lens (or named as collimator), or a cosine corrector, in order for measurement of plural optical physical quantities or optical characteristics, such as spectrum, luminance, illuminance, luminous flux, color temperature, or Color Rendering Index (CRI), etc.

The above mentioned optical elements must be accurately installed in an optical input portion of the spectrometer. Otherwise, deviation of an optical axis of these optical elements may happen. As a result, lights passing through these optical elements travel in their own path rather than a predetermined optical path as designed. Accordingly, a result of optical measurement may be distorted, and therefore reduce accuracy of the optical measurement.

SUMMARY OF THE INVENTION

An object of the present invention is to provide an optical input portion of a spectrometer, and the optical input portion has not only a light receiving function, but also a function to be detachable assembled with an optical element.

Another object of the present invention is to provide a spectrometer including the optical input portion described above.

To achieve the above objects, an optical input portion of a spectrometer in accordance with the present invention, applied to a spectrometer, comprises an assembly structure. The assembly structure is formed on a hole wall of a through hole of the optical input portion. After a light passes through the through hole, the light is incident to a dispersing element of the spectrometer along an optical path and is dispersed by the dispersing element. The assembly structure is used to be detachably assembled with an optical element. When the optical element is assembled with the assembly structure, an optical axis of the optical element is linked to the optical path, and the light to be measured passing through the optical element is incident to the dispersing element along the optical axis and the optical path.

The spectrometer in accordance with the present invention further comprises an optical waveguide member, the dispersing element, and the optical input portion as described above. The optical waveguide member defines an optical path. The dispersing element is disposed in the optical path. The light passing through a through hole of the optical input portion is incident to the dispersing element along the optical path. Multiple spectral components are generated from the light incident to the dispersing element. The assembly structure is used to detachably assemble with an optical element. When the optical element is assembled with the assembly structure, an optical axis of the optical element is linked to the optical path to make the light to be measured passing through the optical element be incident to the dispersing element along the optical axis and the optical path.

To sum up, accordingly, the above mentioned optical input portion of the spectrometer can not only receive the light, but also allow the light to be incident to the dispersing element. The assembly structure of the optical input portion is capable of being assembled with the optical element to enable the optical axis of the optical element to be linked to the optical path defined by the optical waveguide member so as to avoid deviation of the optical axis, and to enhance or maintain accuracy of optical measurements.

In order to further understand features and technology of the present invention, please refer to detailed descriptions and attached drawings presented as below. However, such descriptions and drawings are simply adopted to introduce features and technology of the present invention, and are not used to limit a claimed scope of the present invention.

Explanation to related reference numbers is as below.

1: optical waveguide member  2: dispersing element
4, 4s: slit member  42: slit

-continued

| | |
|---|---|
| 42w: sidewall | |
| 43a: light incidence surface | 43b: light emergence surface |
| 5: optical sensor | 51: connector |
| 6, 6s: decoration shell | 61: opening |
| 7: sealing cap | |
| 12, 12s: reflecting plate | 12a: reflecting surface |
| 13: optical path | |
| 31: housing | 32: optical input portion |
| 32a: first surface | 32b: second surface |
| 100: spectrometer | |
| 200, 200s: optical element | 202: adaptor |
| 210: diffraction structure | 212: triangular prism |
| 220: concave surface | |
| 311: substrate | 312: cover |
| 321: hole wall | 322: assembly structure |
| 311a, 311b: positioning parts | |
| 3211, 3211s: through hole | 3212: central axis |
| 400s: reflective element | |
| A1: angle | |
| L1: light | L2: spectral component |
| P1, P2, P3, P4: configuration length | |

DETAILED DESCRIPTION OF PREFERRED EMBODIMENT

Figure 1A:
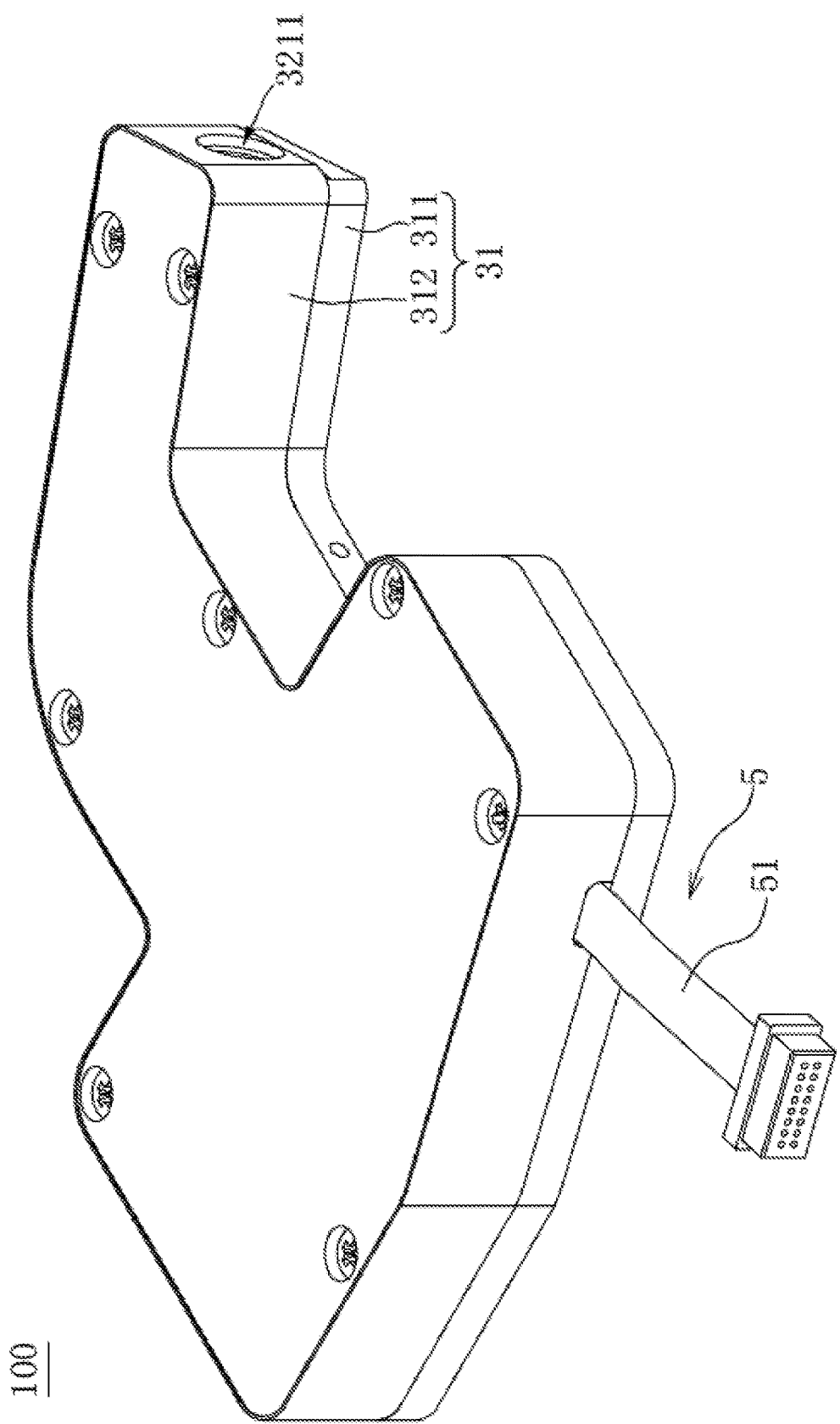
FIG. 1A shows a schematic perspective view showing a spectrometer in accordance with an embodiment of the present invention.
Figure 1B:
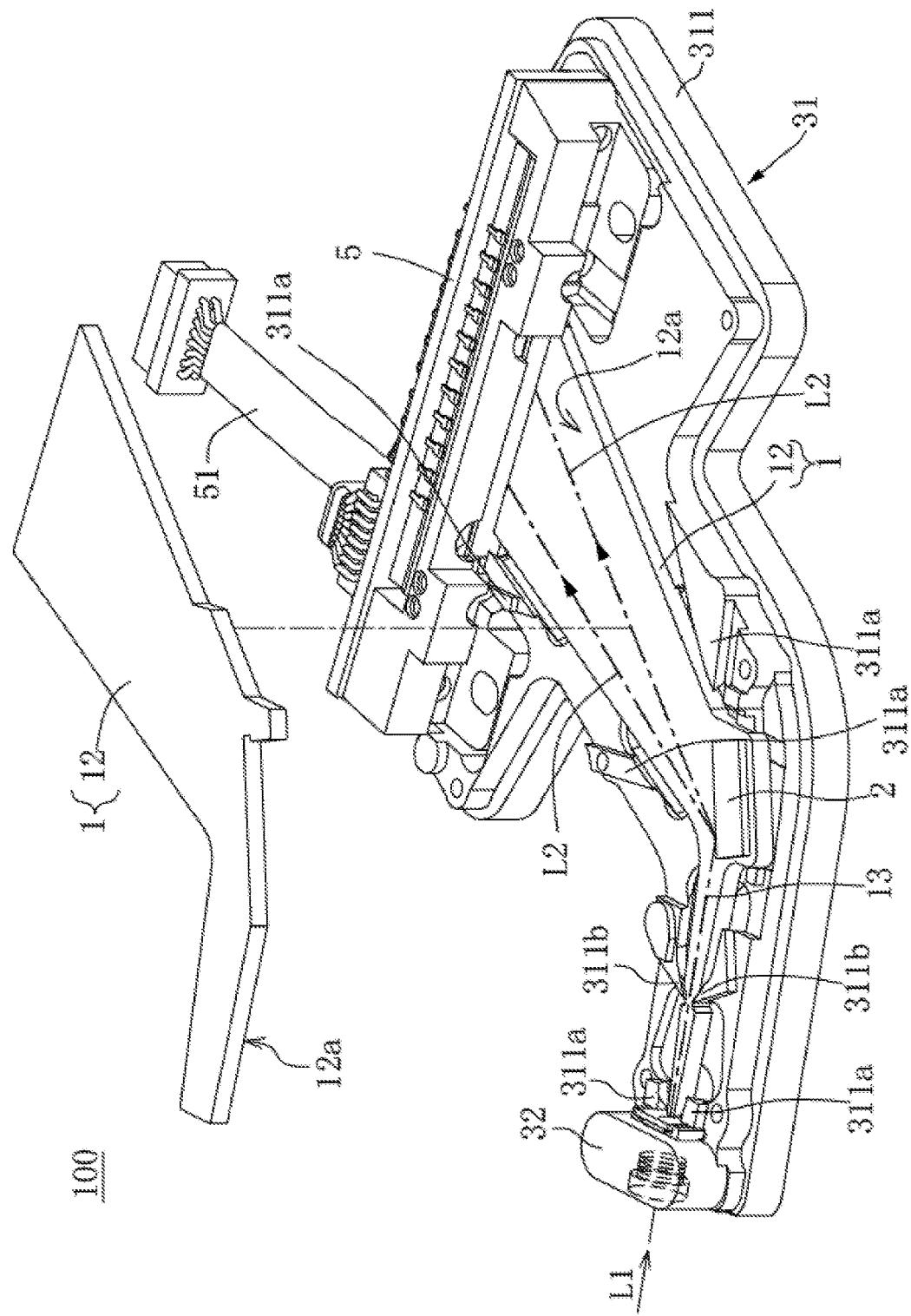
FIG. 1B is a schematic perspective view showing an interior of the spectrometer of FIG. 1A.

FIG. 1A is a schematic perspective view showing a spectrometer in accordance with the present invention. FIG. 1B is a schematic perspective view showing an interior of the spectrometer of FIG. 1A. FIG. 1A and FIG. 1B are drawn respectively in two different viewing angles. With reference to FIG. 1A and FIG. 1B, the spectrometer 100 of the present invention comprises an optical waveguide member 1, a dispersing element 2, and an optical input portion 32. The optical input portion 32 is capable of receiving a light L1 and has a through hole 3211 which is used for the light L1 to pass therethrough. The light L1 passes through the through hole 3211 and then enters the optical waveguide member 1 which defines an optical path 13 and guides the light L1 travelling along the optical path 13. The dispersing element 2 is disposed in the optical path 13, and therefore, the light L1 incident into the optical input portion 32 can be incident to the dispersing element 2 along the optical path 13.

The optical waveguide member 1 guides the light L1 traveling along the optical path 13 via light reflection. In a preferred embodiment shown in FIG. 1B, the optical waveguide member 1 comprises two reflecting plates 12 that are used to reflect the light L1. The reflecting plates 12 may be a rigid plate with hard texture so that the reflecting plates 12 do not tend to have structural deformation when external forces are applied thereon. The above mentioned rigid plate can be exemplified as a metal plate coated with reflective material, a ceramic plate or a glass plate, or a metal plate without being coated with reflective material, for example, a stainless steel plate or an aluminium alloy plate.

Each of the reflecting plates 12 has a reflecting surface 12a. The reflecting surfaces 12a of the reflecting plates 12 are arranged face to face without contact with each other. A gap is formed between the reflecting surfaces 12a of the reflecting plates 12. The gap may be formed by a substrate 311 or a spacer used for separating the reflecting plates 12. The optical path 13 is located in the gap, i.e., the light L1 travels between the reflecting plates 12. In addition, each of the reflecting surfaces 12a has a flatness less than 50 nanometer (nm) in order to reduce scattering of the light L1 when traveling in the optical waveguide member 1. The above mentioned flatness is a height difference between a highest location and a lowest location defined on each of the reflecting surfaces 12a.

In this embodiment, the optical waveguide member 1 guides the light L1 to travel along the optical path 13 via light reflection of the light L1 between the two reflecting plates 12. In other embodiments, however, the optical waveguide member 1 may also guide the light L1 to travel along the optical path 13 via a method of total internal reflection. In details, the optical waveguide member 1 is made of more than two transparent materials arranged to be in contact with one another. The more than two transparent materials have different refractive indexes each of which is different from others. As a result, an interface formed between any two adjacent transparent materials out of the more than two transparent materials due to their different refractive indexes can be used to totally reflect the light L1 in order to keep the light L1 travelling along the optical path 13. In addition, the optical waveguide member 1 that totally reflects the light L1 as above mentioned may be strip optical fiber or platy optical fiber.

Figure 2:
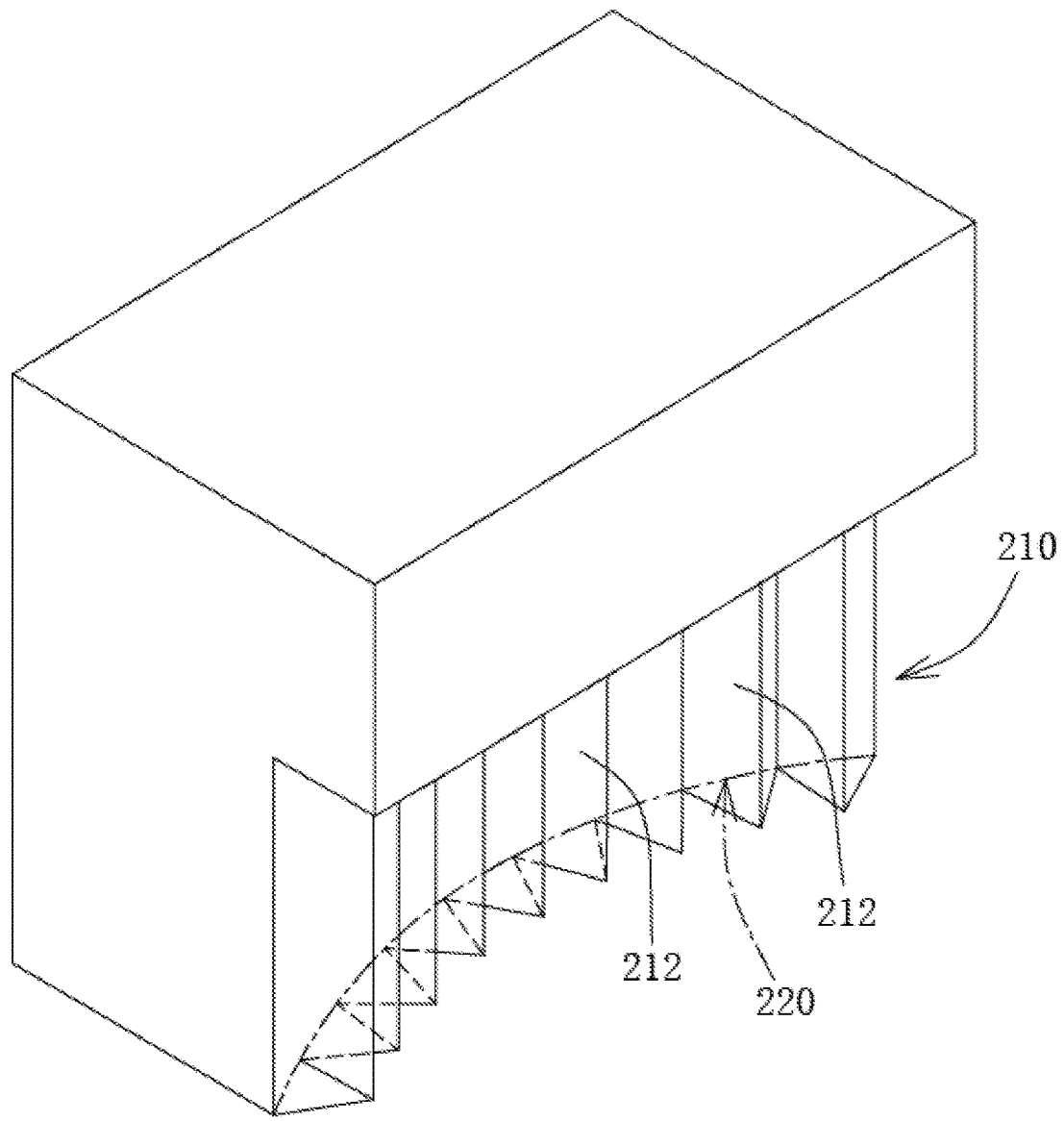
FIG. 2 is a schematic perspective view showing a dispersing element of FIG. 1B.

The dispersing element 2 is capable of splitting the light L1 to produce multiple spectral components L2. The dispersing element 2 can splits the light L1 via optical interference. With reference to FIG. 1B and FIG. 2, which is a schematic perspective view showing the dispersing element 2 of FIG. 1B, the dispersing element 2 may be a reflective diffraction grating, such as a Rowland grating. The dispersing element 2 comprises a diffraction structure 210 used to split lights based on light wavelengths and a concave surface 220. The diffraction structure 210 is formed on the concave surface 220. Viewing from an appearance of the dispersing element 2, the diffraction structure 210 comprises plural triangular prisms 212 or cylinders arranged side by side. The concave surface 220 may be a free-form curve surface, such as a free-form curve surface having a circular arc face or a free-form curve surface having a non-circular arc face. In this embodiment, the triangular prisms 212 are arranged along the concave surface 220.

The concave surface 220 and the diffraction structure 210 can be designed based on specialized light paths. The specialized light paths can be produced by computer simulations so that the diffraction structure 210 disposed on the concave surface 220 can not only split the light L1 into the multiple spectral components L2 but also can converge the multiple spectral components L2 to one location. In addition, the dispersing element 2 may be manufactured by a Micro-Electromechanical System Process (MEMS Process), and may be made of silicon. Alternatively, the dispersing element 2 may be manufactured by methods including electroforming, holography, or machining processing (such as tool cutting), etc.

Although the dispersing element 2 of this embodiment in accordance with the present invention is a reflective diffraction grating, the dispersing element 2 in other embodiments may also be a hologram, prism or filter. In other words, the dispersing element 2 can also split the light L1 via other methods except optical interference, such as refraction or filtering. In addition, in other embodiments, the dispersing element 2 can also be a transmissive diffraction grating. Therefore, the dispersing element 2 is not limited to the reflective diffraction grating as described above.

With reference to FIG. 1A and FIG. 1B, the spectrometer 100 further comprises an optical sensor 5 equipped with charge-coupled device (CCD) or CMOS (complementary metal-oxide-semiconductor) image sensor (CIS). The optical sensor 5 receives the spectral components L2 for spectral analysis. Via the diffraction structure 210 disposed on the concave surface 220, the dispersing element 2 can converge the spectral components L2 to the optical sensor 5. The optical sensor 5 converts the spectral components L2 to electrical signals, such as analog signals. The electrical signals are then transmitted to a spectral analysis equipment (not shown) via a connector 51 of the optical sensor 5. The connector 51 may have a flex flat cable (FFC) or a flexible printed circuit (FPC), as shown in FIG. 1A and FIG. 1B. The spectral analysis equipment may be a computer having a computing module.

The computing module may be a microprocessor or a printed circuit board assembly (PCBA) equipped with a microprocessor, and the PCBA comprises an analog-to-digital converter (A to D converter) used to convert analog signals, such as the above mentioned electrical signals, to digital signals. As a result, the spectral analysis equipment can analyze the electrical signals generated from the optical sensor 5. Alternatively, in other embodiments, the optical sensor 5 may also be selected to be a sensor that can directly convert the spectral components L2 to digital signals. Therefore, the computing module can directly receive the digital signals from the optical sensor 5, and the PCBA may not need to use the above mentioned analog-to-digital converter for signal processing.

In addition, although the connector 51 shown in both of FIG. 1A and FIG. 1B has the FFC or FPC, the connector 51 in other embodiments may have a plug only without any FFC, FPC, or other kinds of buses. In addition, the spectrometer 100 in other embodiments may also comprise a wireless module. The wireless module electrically connects to the optical sensor 5 of the other embodiments and converts the electrical signals output by the optical sensor 5 to wireless signals, and then transmits the wireless signals to the spectral analysis equipment.

The spectrometer 100 further comprises a housing 31. The optical input portion 32, the optical waveguide member 1 and the dispersing element 2 are disposed inside the housing 31. A through hole 3211 is exposed from an outer surface of the housing 31. The housing 31 comprises the substrate 311 mentioned above and a cover 312, and the cover 312 is assembled with the substrate 311. Assembly between the substrate 311 and the cover 312 may be achieved by screwing, snap fit, or transition fit. Besides, the spectrometer 100 as shown in FIG. 1B is drawn and presented after the cover 312 is removed.

The substrate 311 is equipped with plural positioning parts 311a, 311b. The optical input portion 32, the optical waveguide member 1 and the dispersing element 2 are disposed and fixed on the substrate 311, and the dispersing element 2 is disposed on a lower reflecting plate 12 out of the two reflecting plates 12. The positioning parts 311a, 311b are located around the lower reflecting plate 12 in order to hold the optical waveguide member 1 in position. An upper reflecting plate 12 out of the two reflecting plates 12 is disposed above the positioning parts 311a, 311b. The dispersing element 2 abuts against the upper reflecting plate 12 so that a horizontal position of the dispersing element 2 is fixed. Therefore, the upper reflecting plate 12 can be supported by the positioning parts 311a, 311b without physically contacting with the lower reflecting plate 12. The gap used for the light L1 to travel therethrough is therefore formed between the two reflecting plates 12. The cover 312 completely covers the optical waveguide member 1 and the dispersing element 2 disposed on the substrate 311 to protect the optical waveguide member 1 and the dispersing element 2 against accidental collision from outside objects.

In the embodiment with respect to FIG. 1B, there are two positioning parts 311b in use. The two positioning parts 311b are disposed apart from each other. An opening is formed between the two positioning parts 311b. The light L1 passing through the optical input portion 32 enters the opening located between the two positioning parts 311b, and then travels from the opening to the dispersing element 2. When the light L1 enters the opening, the two positioning parts 311b block a part of the light L1 so as to reduce stray light to be generated.

Besides, it is required to explain that the embodiment with respect to FIG. 1B is depicted to present five positioning parts 311a and two positioning parts 311b in FIG. 1B. In an alternative embodiment, the substrate 311 may only have two positioning parts, such as two positioning parts 311a or two positioning parts 311b. Therefore, the substrate 311 is not limited to three or more than three positioning parts, and may only have any one of the positioning parts 311a and the positioning parts 311b. In other word, the substrate 311 may only have the positioning parts 311a without the positioning parts 311b, or only have the positioning parts 311b without the positioning parts 311a.

Figure 3A:
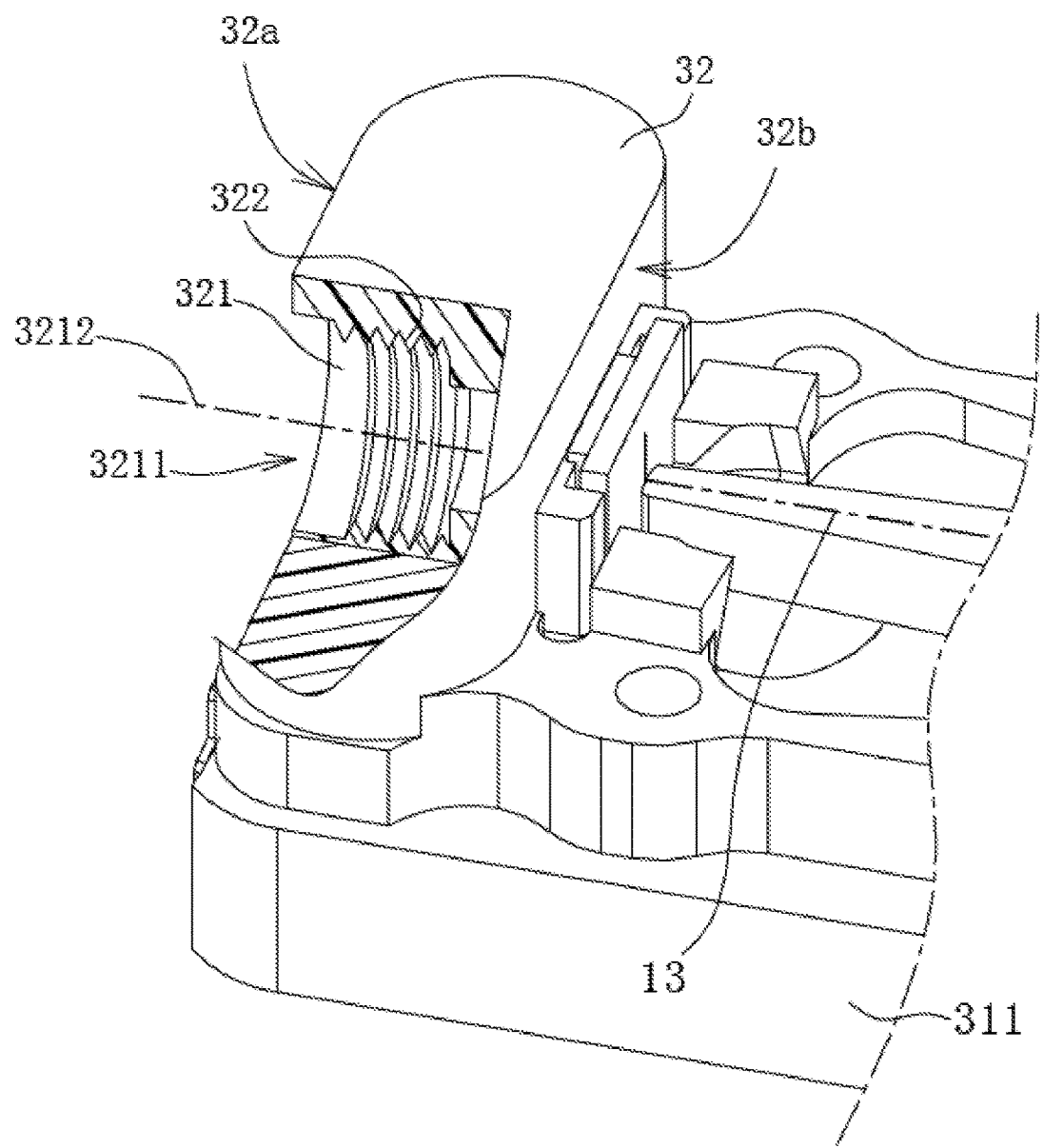
FIG. 3A is a schematic partial cross-sectional perspective view of the spectrometer of the present invention as shown in FIG. 1B.

FIG. 3A is a partial cross-sectional perspective view of the spectrometer 100 as shown in FIG. 1B. With reference to FIG. 1B and FIG. 3A, in the optical input portion 32, the through hole 3211 has a hole wall 321 and a central axis 3212 surrounded by the hole wall 321. The hole wall 321 has a shape of a cylindrical curve surface. The central axis 3212 is linked to the optical path 13, i.e., the central axis 3212 is optically coupled to the optical path 13. Hence, when the light L1 is incident into the optical input portion 32 along the central axis 3212, the light L1 leaving the through hole 3211 can travel along the optical path 13. Therefore, the optical waveguide member 1 can guide the light L1 toward the dispersing element 2 so that the dispersing element 2 splits the light L1 into the multiple spectral components L2.

Figure 3B:
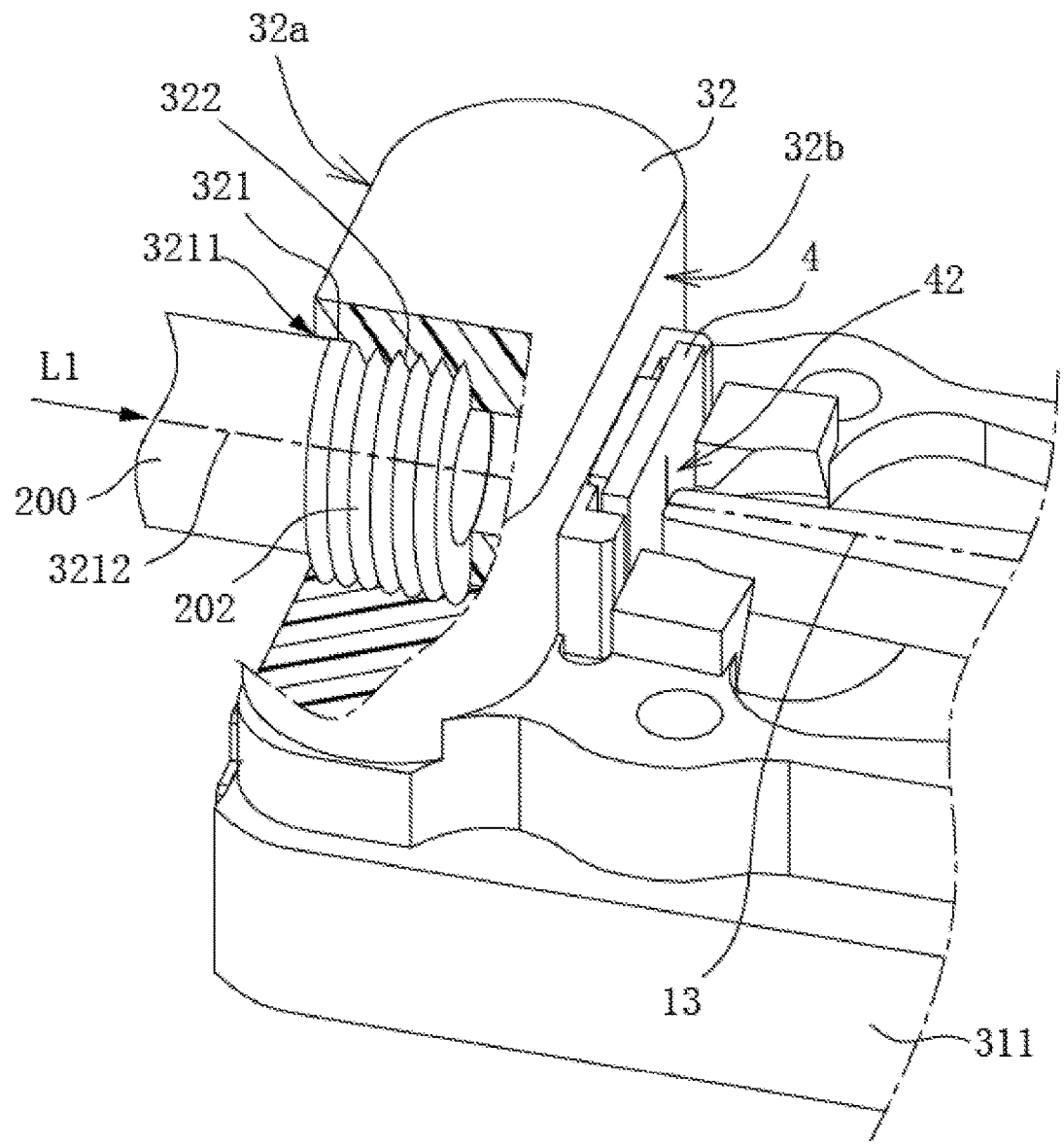
FIG. 3B is a schematic partial cross-sectional perspective view of the spectrometer as shown in FIG. 3A showing the spectrometer is assembled with an optical element.

FIG. 3B is a partial cross-sectional perspective view of the spectrometer 100 as shown in FIG. 3A showing the spectrometer 100 is assembled with an optical element 200. With reference to FIG. 3A and FIG. 3B, the optical input portion 32 comprises an assembly structure 322 formed on the hole wall 321 and used to be detachably assembled with the optical element 200. Hence, the optical element 200 is capable of being insertedly installed in the through hole 3211. The optical element 200 may be, for example, a fiber, a collimating lens, a cosine corrector or any arbitrary combination thereof. In addition, the optical element 200 comprises an optical fiber connector, such as optical fiber connectors of models of SMA 905, SMA 906 or FSMA. The assembly structure 322 is able to be assembled with the optical fiber connector as mentioned above.

In the present specification, the term of "detachable" or "detachably" refers to a meaning that after two objects (such as the optical element 200 and the optical input portion 32) are assembled with each other, the assembled two objects can be disassembled and then reassembled over and over again for many times without using violence and substantially damaging the two objects. Furthermore, the optical input portion 32 has a first surface 32a and a second surface 32b opposite to the first surface 32a. The first surface 32a is farther away from the dispersing element 2 than the second surface 32b. The through hole 3211 extends from the first surface 32a to the second surface 32b. The light L1 enters the through hole 3211 from the first surface 32a and leaves the through hole 3211 from the second surface 32b, and then travels along the optical path 13. Furthermore, the assembly structure 322 can extends from the first surface 32a toward the second surface 32b, and the assembly structure 322 can extends to reach the second surface 32b. Alternatively, the assembly structure 322 does not extend to reach the second surface 32b. Therefore, the assembly structure 322 does not protrude out of the first surface 32a and the second surface 32b, i.e., the assembly structure 322 does not protrude out of any outer surface of the optical input portion 32 other than the through hole 3211 of the optical input portion 32.

When the optical element 200 is assembled with the assembly structure 322, the optical element 200 is insertedly installed into the through hole 3211 from the first surface 32a, i.e., at least a part of the optical element 200 is submerged into the through hole 3211, and the part of the optical element 200 inserted in the through hole 3211 may not protrude out of the second surface 32b. When the optical element 200 is disassembled from the assembly structure 322, the optical element 200 is withdrawn out of the through hole 3211 from the first surface 32a. In addition, disassembly of the optical element 200 from the assembly structure 322 does not affect, interfere or damage assembly of the other components, and no disassembly of the other components is required. Thus, during the disassembly of the optical element 200 from the assembly structure 322, the substrate 311 and the cover 312 remain assembled without detachment. In other words, under a condition of assembly of the substrate 311 and the cover 312 with each other, a user can dismantle the optical element 200 directly out of the assembly structure 322.

A distance from one of any two portions of the assembly structure 322 to the central axis 3212 and a distance from the other of the any two portions of the assembly structure 322 to the central axis 3212 are substantially same as each other, i.e., both of the assembly structure 322 and the through hole 3211 use the central axis 3212 as a common axis. In other word, the assembly structure 322 and the through hole 3211 are coaxial. In this manner, when the optical element 200 is assembled with the assembly structure 322, an optical axis of the optical element 200 and the central axis 3212 are substantially coaxial, i.e., the optical axis and the central axis 3212 are completely overlapped. Accordingly as shown in FIG. 3B, the central axis 3212 can be treated as the optical axis of the optical element 200. Meanwhile, the optical axis of the optical element 200 is linked to the optical path 13, i.e., the optical axis is optically coupled to the optical path 13. Thus, a light to be measured, i.e., the light L1 as shown in FIG. 3B, passing through the optical element 200 is incident the dispersing element 2 along the optical axis (equivalent to the central axis 3212) and the optical path 13.

It is understandable that the optical input portion 32 can receive the light L1 because of having the through hole 3211, and can be precisely assembled with the optical element 200 and can make the optical element 200 optically coupled to the optical path 13 because of having the assembly structure 322. In addition, since the assembly structure 322 is formed on the hole wall 321 of the through hole 3211 and does not protrude out of the first surface 32a and the second surface 32b, the assembly structure 322 is not so easy to suffer from impact by external objects when the assembly structure 322 is not assembled with the optical element 200 so as to avoid alteration of a coaxial status of the assembly structure 322 and the through hole 3211. As a result, the optical axis of the optical element 200 can be ensured to be coaxial with the central axis 3212 by a design of the assembly structure 322.

There are many ways to assemble the optical element 200 with the assembly structure 322. In the current embodiment of the present invention, the above mentioned assembly way can be screwing. More specifically, the assembly structure 322 may be an inner thread, and the optical element 200 has an adaptor 202. A spiral trajectory is formed along the minimum inner radius of the inner thread (equivalent to a minimum hole radius of the through hole 3211). Because the assembly structure 322 and the through hole 3211 are coaxial, a distance between one of any two points set at the spiral trajectory and the central axis 3212 of the through hole 3211 is same as a distance between the other of the any two points set at the spiral trajectory and the central axis 3212. The adaptor 202 may have an outer thread in order to be engaged with the assembly structure 322. The adaptor 202 may be an optical fiber connector. In use of the adaptor 202, the optical element 200 can be screwed in the through hole 3211 via the inner thread (i.e., the assembly structure 322). Alternatively the adaptor 202 can be insertedly installed in the through hole 3211. In an alternative embodiment of the present invention, assembly between the optical element 200 and the assembly structure 322 may be transition fit or snap fit. Therefore, the assembly between the optical element 200 and the assembly structure 322 is not limited to screwing.

It is worth mentioning that, in the current embodiment of the present invention, the optical input portion 32 is integrally formed with the substrate 311. In other words, the optical input portion 32 and the substrate 311 have a same constituting material and both of them are formed in a same manufacturing process. For example, the optical input portion 32 and the substrate 311 are formed in a same injection molding process or a same casting process. Hence, the optical input portion 32 and the substrate 311 are substantially simultaneously formed. Besides, the optical input portion 32 and the substrate 311 are engaged and directly connected with each other, and are not indirectly connected via auxiliary components such as adhesive materials or screws, etc. Thus, the optical input portion 32 can be firmly fixed on the substrate 311 without any relative movement therebetween. In addition, in other embodiments, the optical input portion 32 may be integrally formed with the cover 312. Therefore, the optical input portion 32 is not limited to be only integrally formed with the substrate 311.

Figure 4A:
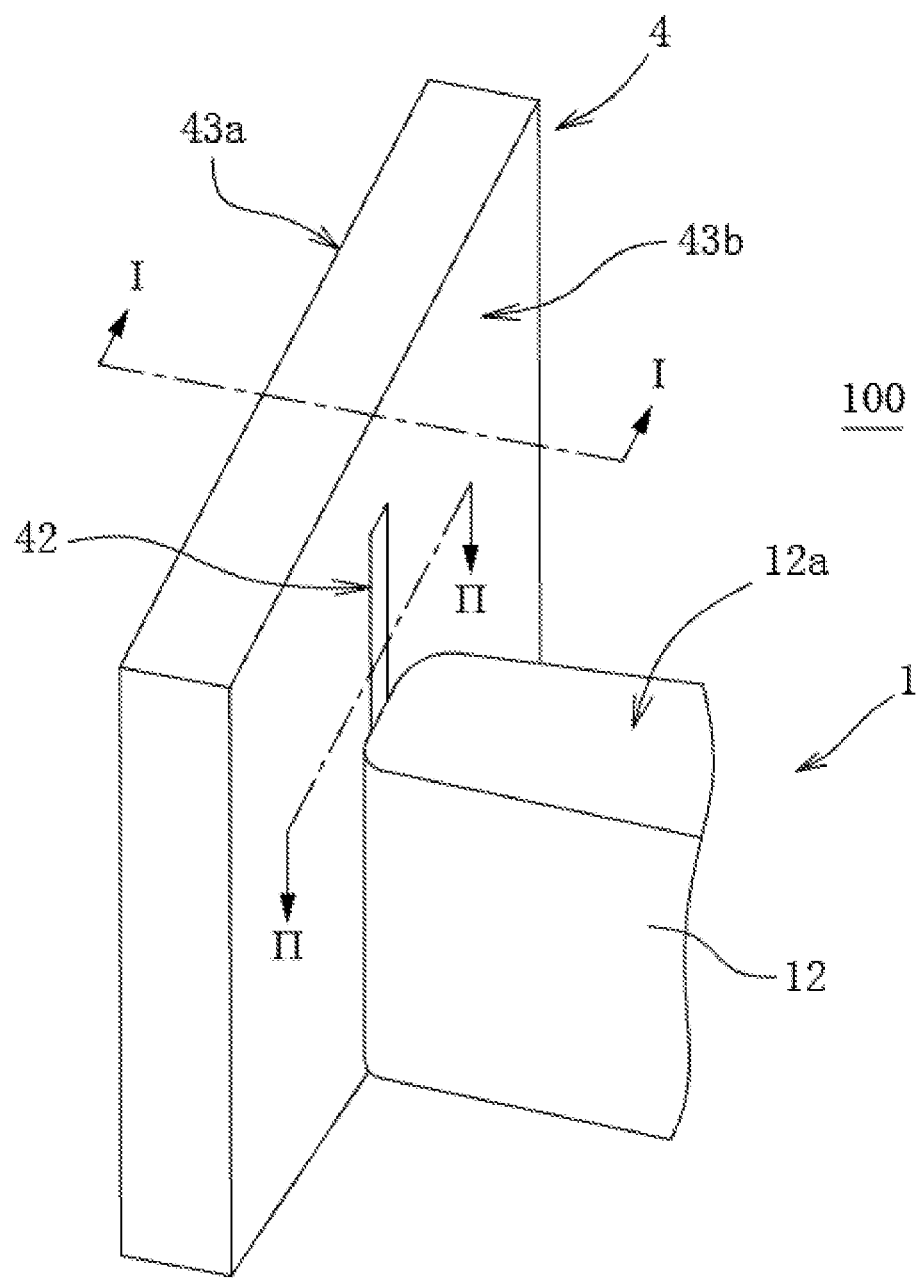
FIG. 4A is a schematic partially enlarged perspective view of FIG. 3B.

FIG. 4A is a schematic partially enlarged perspective view of FIG. 3B. With reference to FIG. 3B and FIG. 4A, the spectrometer 100 further comprises a slit member 4. The slit member 4 is disposed between the optical input portion 32 and the optical waveguide member 1. The slit member 4 has a slit 42, a light incidence surface 43a and a light emergence surface 43b opposite to the light incidence surface 43a. The slit 42 extends from the light incidence surface 43a to the light emergence surface 43b and is located in the optical path 13 so as to enable the light L1 is incident to the slit 42 from the light incidence surface 43a and then exits from the light emergence surface 43b. An extending direction of the slit 42 may be perpendicular to the reflecting surface 12a, as shown in FIG. 4A. In an alternative embodiment, an extending direction of the slit 42 may be not perpendicular but parallel to the reflecting surface 12a in coordination with designs of optical systems. Therefore, the extending direction of the slit 42 is not limited to be perpendicular to the reflecting surface 12a.

Figure 4C:
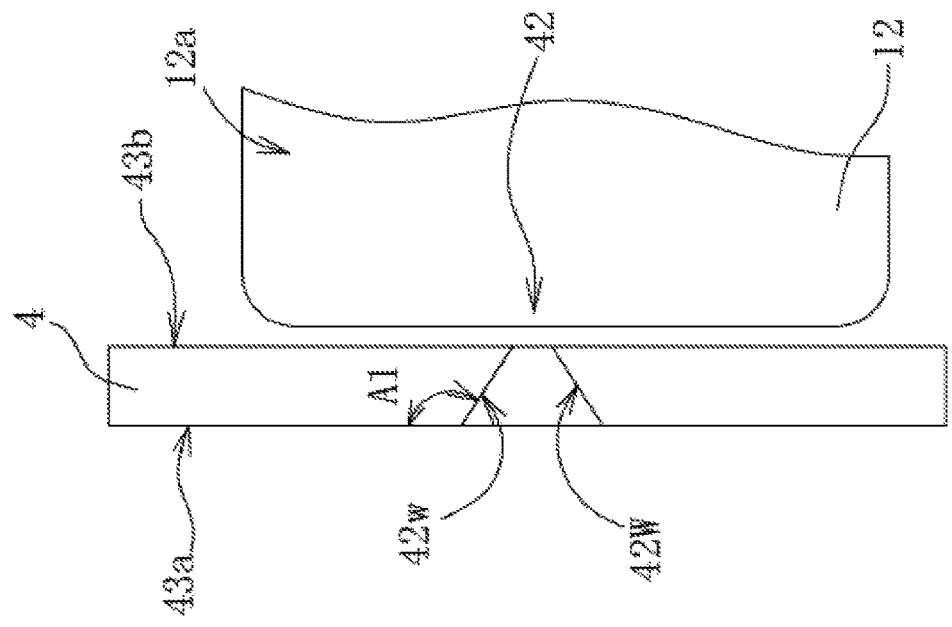
FIG. 4C is a schematic cross-sectional view of FIG. 4A taken along Line II-II shown in FIG. 4A.
Figure 4B:
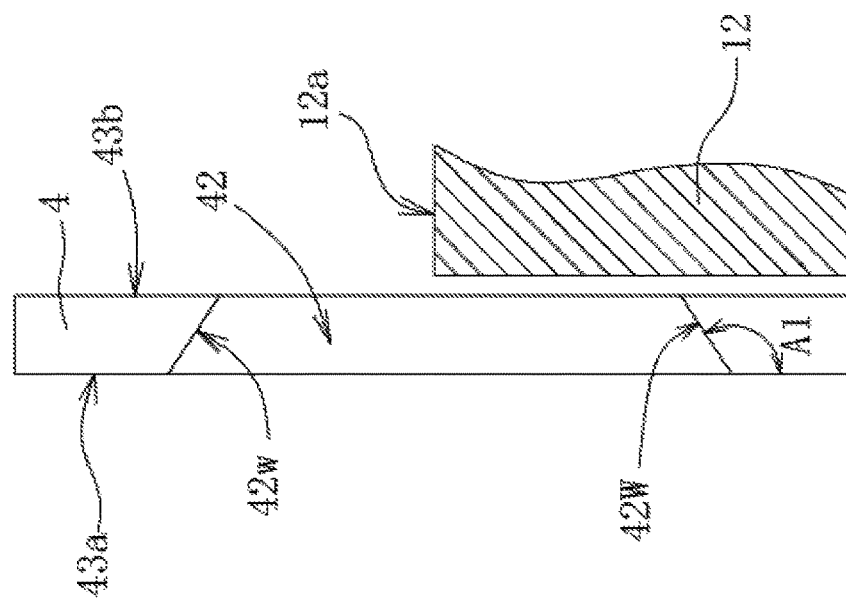
FIG. 4B is a schematic cross-sectional view of FIG. 4A taken along Line I-I shown in FIG. 4A.

FIG. 4B is a schematic cross-sectional view of FIG. 4A taken along Line I-I shown in FIG. 4A. FIG. 4C is a schematic cross-sectional view of FIG. 4A taken along Line II-II shown in FIG. 4A. In FIG. 4B, a cross-section of the reflecting plate 12 is shown, and in FIG. 4C, the reflecting surface 12a of the reflecting plate 12 is viewed from a top thereof. With reference to FIG. 4A to FIG. 4C, in the current embodiment of the present invention, a size of the slit 42 is varied to be gradually decreased from the light incidence surface 43a to the light emergence surface 43b. The slit 42 has a plurality of sidewalls 42w. An angle A1 between any one of the plurality of sidewalls 42w of the slit member 4 and the light incidence surface 43a is greater than 90 degree. For example, the slit member 4 is made of a silicon wafer, and the slit 42 is formed by etching. Based on atomic arrangement in the silicon wafer, the slit 42 formed via etching the silicon wafer has the angle A1 being about 135 degree.

Nevertheless, it is required to be explained that, in an alternative embodiment, the size of the slit 42 remains uniform from the light incidence surface 43a to the light emergence surface 43b. In other words, the angle A1 is substantially equal to 90 degree, and the plurality of sidewalls 42w are substantially perpendicular to both of the light incidence surface 43a and the light emergence surface 43b so as to ensure the uniform size of the slit 42. Therefore, the size of the slit 42 from the light incidence surface 43a to the light emergence surface 43b is not limited to be gradually decreased.

Figure 5:
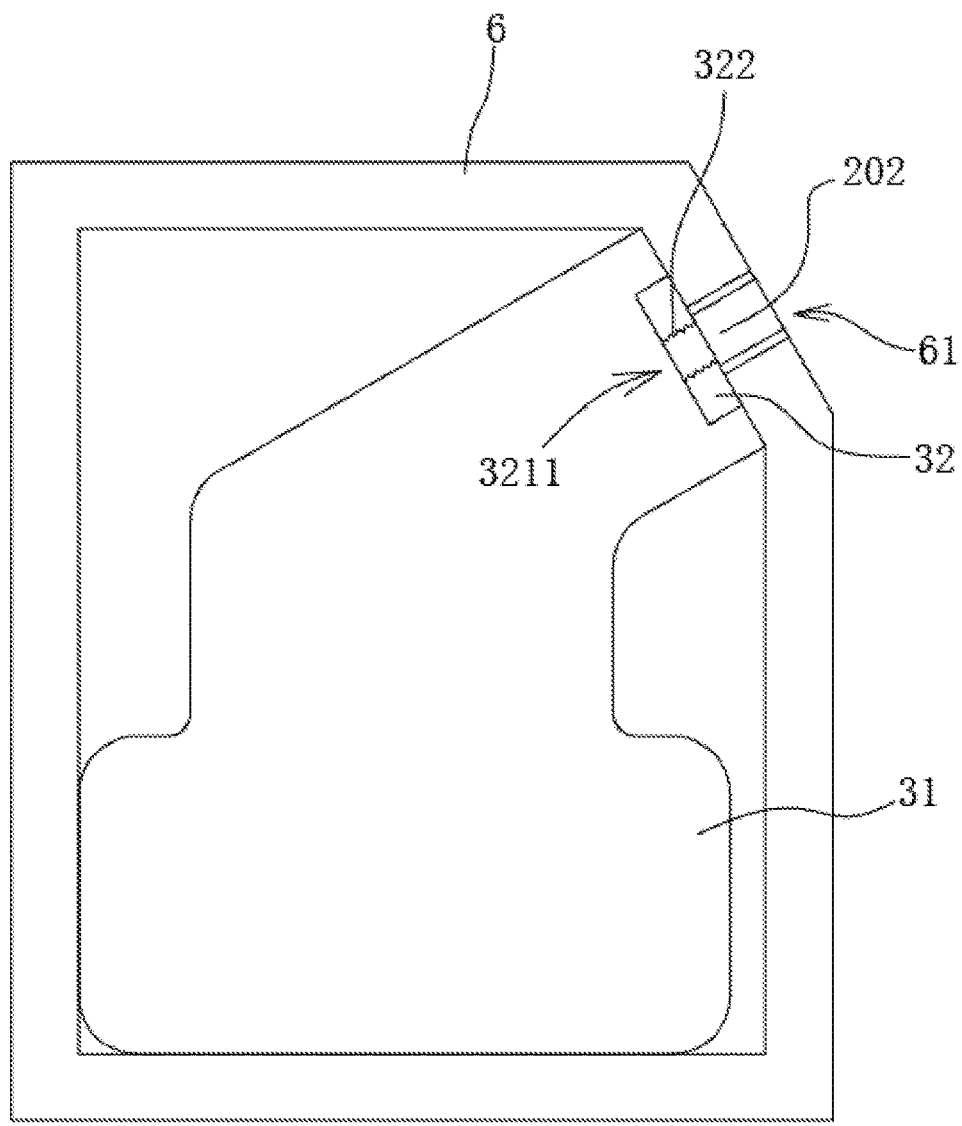
FIG. 5 is a schematic top view of the spectrometer of FIG. 1A.

FIG. 5 is a schematic top view of the spectrometer 100 of FIG. 1A. With reference to FIG. 5, in this embodiment of the present invention, the spectrometer 100 further comprises a decoration shell 6. The decoration shell 6 may be an outermost shell of the spectrometer 100. When the spectrometer 100 is completely manufactured for sale in the market, the decoration shell 6 is used to present an appearance of the spectrometer 100. An entire shape of the spectrometer 100 is substantially same as a shape of the decoration shell 6. Hence, an outer appearance of the decoration shell 6 is actually equal to the appearance of the spectrometer 100. The housing 31 and other components disposed therein (such as the optical waveguide member 1 and the dispersing element 2) are disposed in the decoration shell 6. The through hole 3211 of the optical input portion 32 is exposed from the decoration shell 6 in order to enable the light L1 to pass through the through hole 3211 and enable the adaptor 202 to be detachably assembled and insertedly disposed in the through hole 3211. In addition, the optical element 200 as described above may be a collimating lens, a cosine corrector, or a fiber equipped with a connector, and the adaptor 202 may be an optical fiber connector.

After the adaptor is assembled with the assembly structure 322, the adaptor 202 does not protrude out of the outer appearance of the decoration shell 6. Hence, after the adaptor 202 is detachably assembled with the spectrometer 100, the adaptor 202 is immerged in the spectrometer 100, and an end of the adaptor 202 is flush with the outer appearance of the decoration shell 6, or is recessed into the outer appearance of the decoration shell 6. As a result, chances that the adaptor 202 is under impact of external objects can be decreased in order to avoid deviation of the optical axis of the optical element 200 caused by impact applied on the adaptor 202.

In addition, disassembly between the assembly structure 322 and the adaptor 202 does not affect, interfere or damage assembly between the other components, and does not require disassembly of the other components. For example, when the adaptor 202 is dismantled from the assembly structure 322, the decoration shell 6 and the housing 31 are not required to be dismantled and/or removed. In other words, users can dismantle the adaptor 202 directly from the assembly structure 322 in condition that the decoration shell 6 and the housing 31 are maintained to be assembled with each other.

Because the adaptor 202 can be insertedly installed in the through hole 3211, at least a part of the adaptor 202 is immerged in the optical input portion 32. As a result, the adaptor 202 can be immerged in the spectrometer 100 without the decoration shell 6 having a large thickness. For conventional existing spectrometers, their adaptor is seldom insertedly installed in their optical input portion. Hence, a large thickness of their shell is necessary for the adaptor to be immerged in their shell. Therefore, compared with the conventional existing spectrometers, the decoration shell 6 in accordance with the present invention can have a thinner thickness in order to contribute to reduction of a volume of the spectrometer 100.

Figure 6:
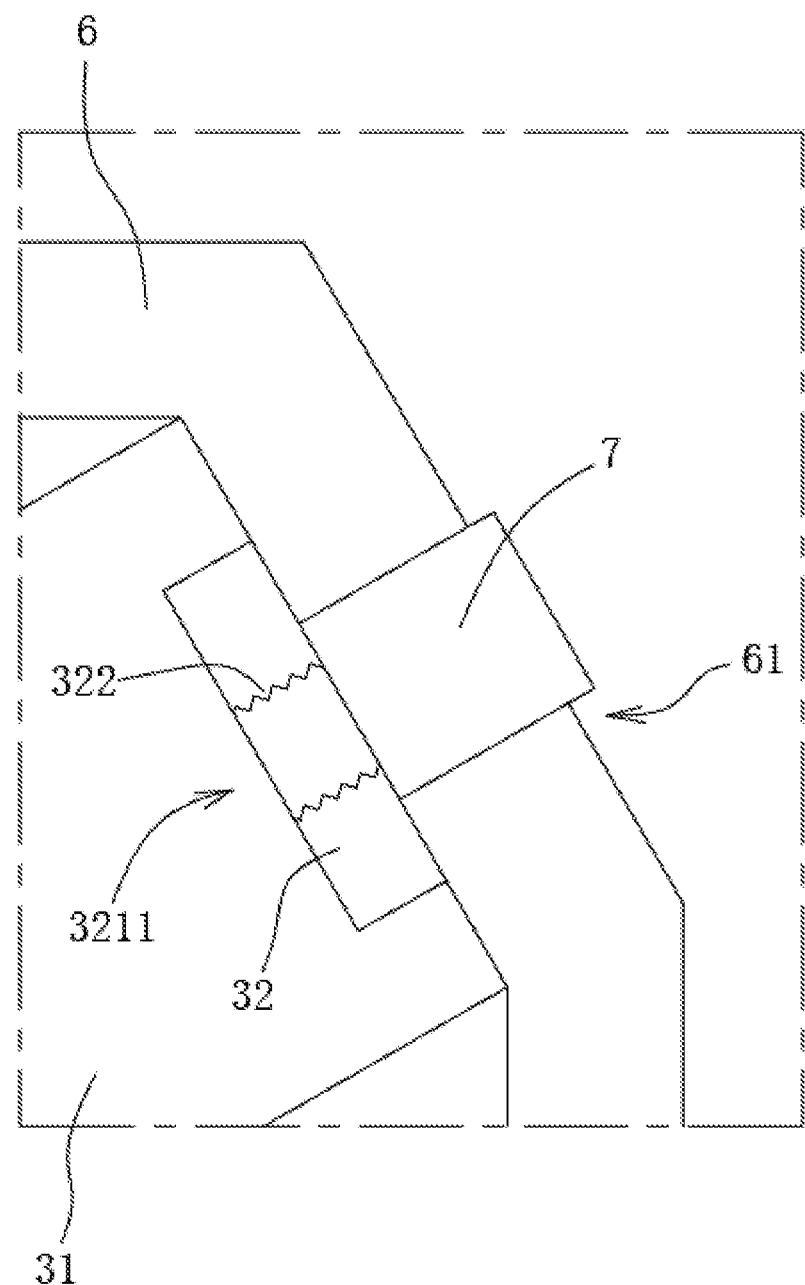
FIG. 6 is a schematic partially enlarged top view of FIG. 5.

FIG. 6 is a schematic partially enlarged top view of the spectrometer 100 of FIG. 5 without being assembled with the adaptor 202. With reference to FIG. 6, in this embodiment of the present invention, the spectrometer 100 further comprises a seal cap 7, and the decoration shell 6 has an opening 61. The opening 61 of the decoration shell 6 is spatially communicated with the through hole 3211. The seal cap 7 is disposed in the opening 61 and capable of covering the through hole 3211. The seal cap 7 may be detachably or movably disposed in the opening 61. For example, the seal cap 7 is movably disposed in the opening 61 by using slide tracks or spindles. Furthermore, the seal cap 7 is avoided being missing if the seal cap 7 is movably disposed in the opening 61. As a result, when the spectrometer 100 is not equipped with the optical element 200, the seal cap 7 can cover the through hole 3211 to avoid invasion of dust and other foreign matters into the spectrometer 100 through the through hole 3211.

In addition, the seal cap 7 may be disposed in the opening 61 by screwing, snap fit, or transition fit, and the seal cap 7 may be attached to the decoration shell 6 in order to reduce possibility of losing the seal cap 7. For example, the seal cap 7 may be connected with the decoration shell 6 via a rope, band or chain. Alternatively, the seal cap 7 may be slidably disposed or pivotally connected with the decoration shell 6. Nevertheless, it is required to be explained that, in an alternative embodiment, the spectrometer 100 may not include the seal cap 7. In other words, the seal cap 7 of FIG. 6 is exemplified for illustrations only. The spectrometer 100 is not limited to include the seal cap 7.

It is required to be explained that, although the spectrometer 100 of FIG. 5 and FIG. 6 comprises the housing 31 and the decoration shell 6, the spectrometer 100 may comprise the decoration shell 6 only without any housing 31. In other words, the components originally disposed in the housing 31, such as the optical input portion 32, the optical waveguide member 1 and the dispersing element 2, can be directly disposed in the decoration shell 6. In addition, the optical input portion 32 may further be integrally formed with at least a component of the decoration shell 6, i.e., similar to the housing 31 as described above, the decoration shell 6 may comprise the substrate and the cover, and the optical input portion 32 and the substrate or the cover of the decoration shell 6 are made of a same constituting material and are formed in a same manufacturing process. As a result, the optical input portion 32 can be firmly fixed on the substrate or the cover of the decoration shell 6.

Figure 7A:
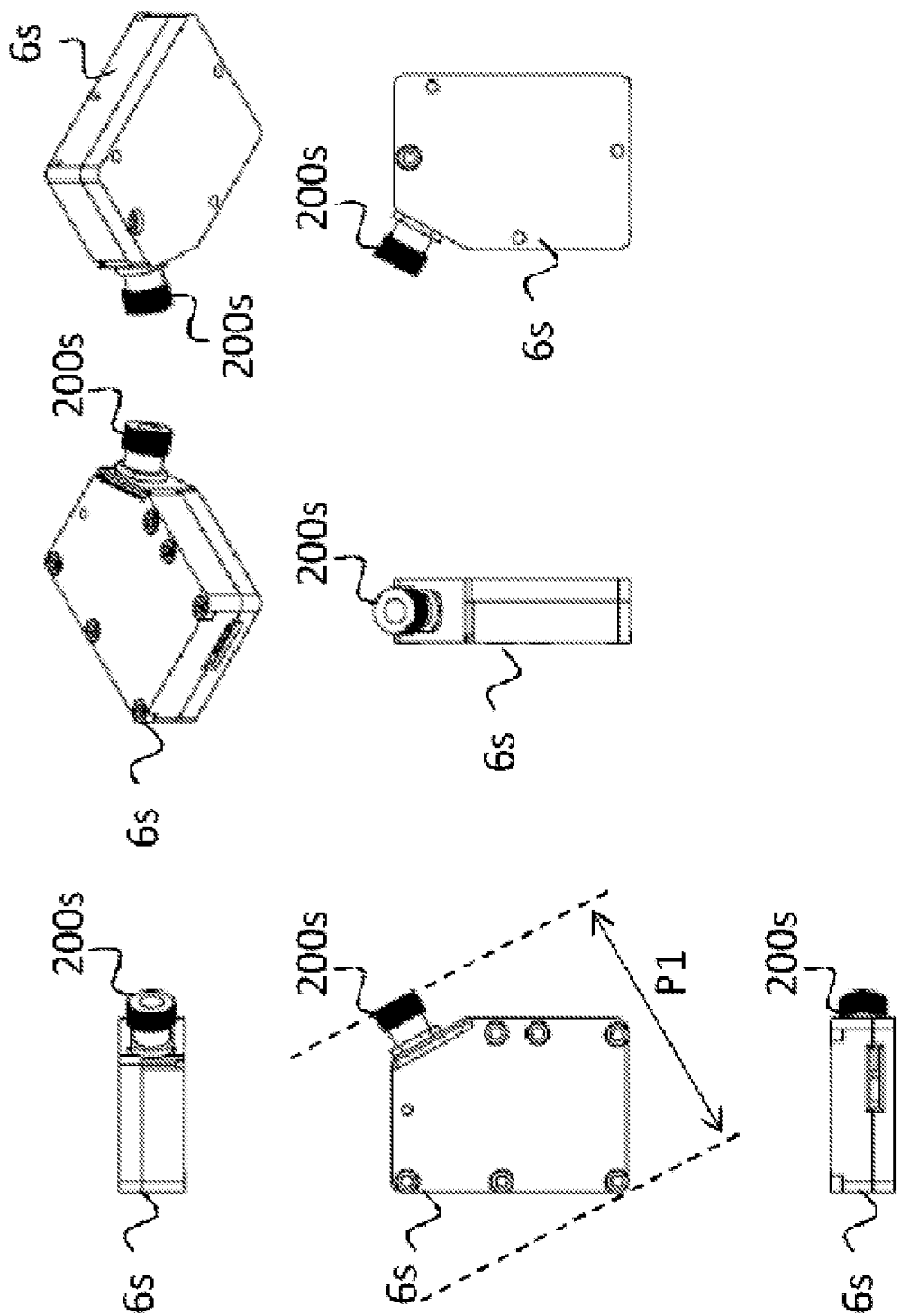
FIG. 7A is a set of schematic views showing a spectrometer equipped with an optical element viewed from different viewing angles in accordance with another embodiment of the present invention.
Figure 7B:
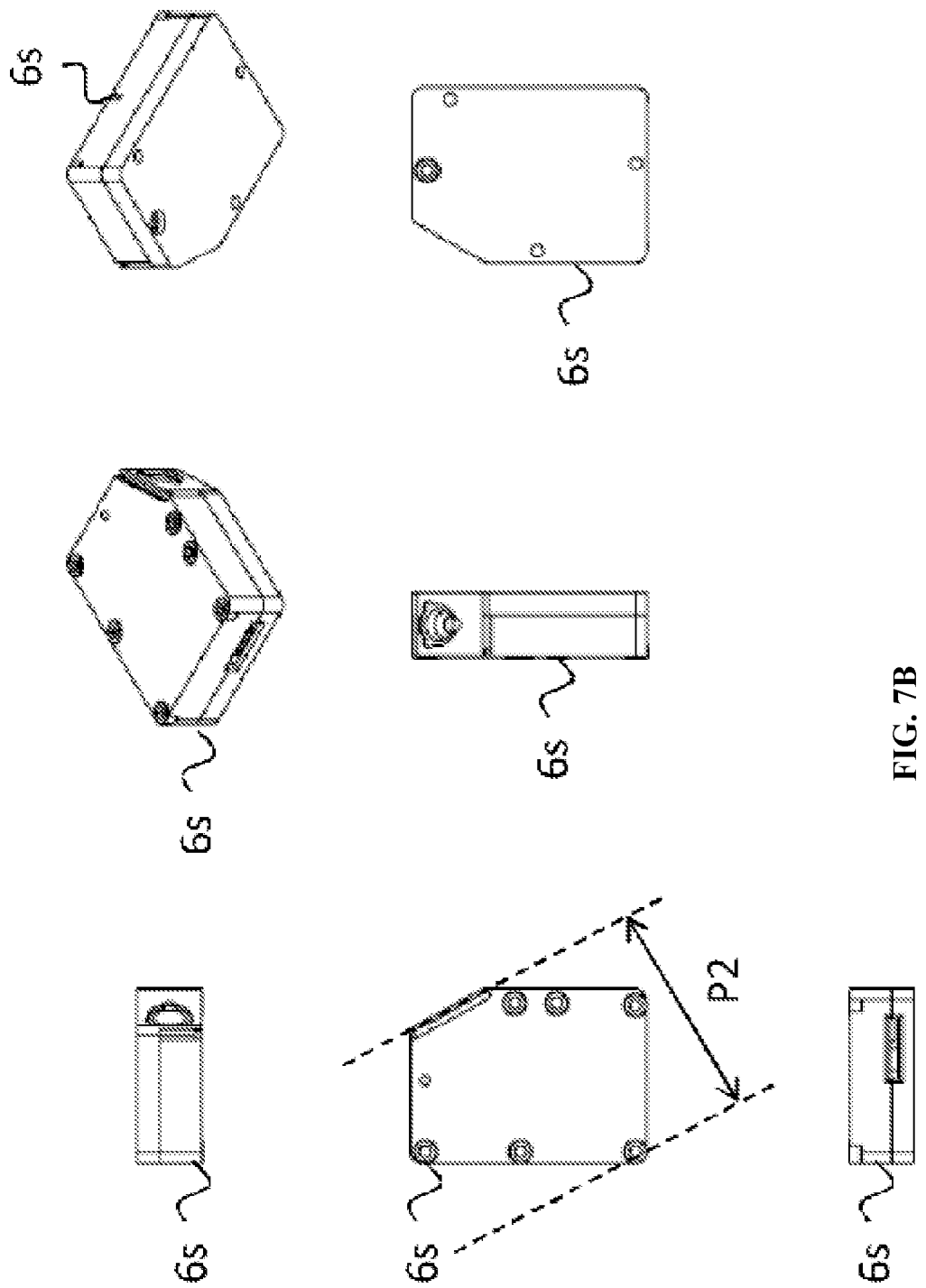
FIG. 7B is a set of schematic views showing a spectrometer without any optical element viewed from different viewing angles in accordance with another embodiment of the present invention.

FIG. 7A is a set of schematic views showing a spectrometer equipped with an optical element viewed from different viewing angles in accordance with another embodiment of the present invention. FIG. 7B is a set of schematic views showing a spectrometer without any optical element viewed from different viewing angles in accordance with another embodiment of the present invention. With reference to FIG. 7A and FIG. 7B in combination, the spectrometer equipped with an optical element 200s is capable of expanding functions of the spectrometer. It is noted that when the spectrometer equipped with the optical element 200s is integrated in a practical product, the practical product is required to reserve a configuration length P1 for placement of the spectrometer. When the practical product only requires a self function of the spectrometer, the practical product needs to reserve a configuration length P2 for placement of the spectrometer. The configuration length P2 is smaller than the configuration length P1. In other word, the optical input portion of the spectrometer having the assembly structure for disassembly of the optical element 200s is convenient for the integration of the spectrometer in the practical product.

Figure 8:
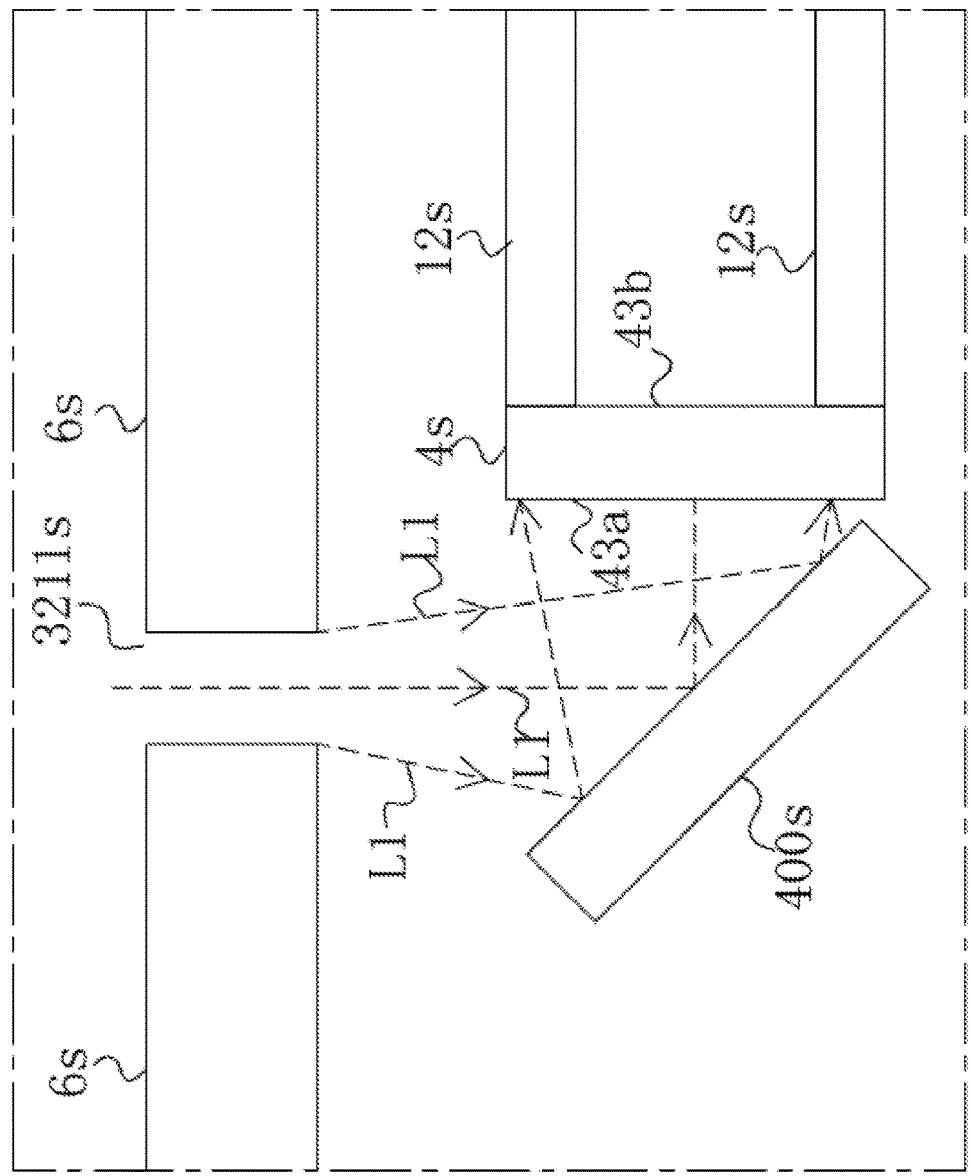
FIG. 8 is a schematic view showing a spectrometer equipped with a reflective element in accordance with further another embodiment of the present invention.
Figure 9A:
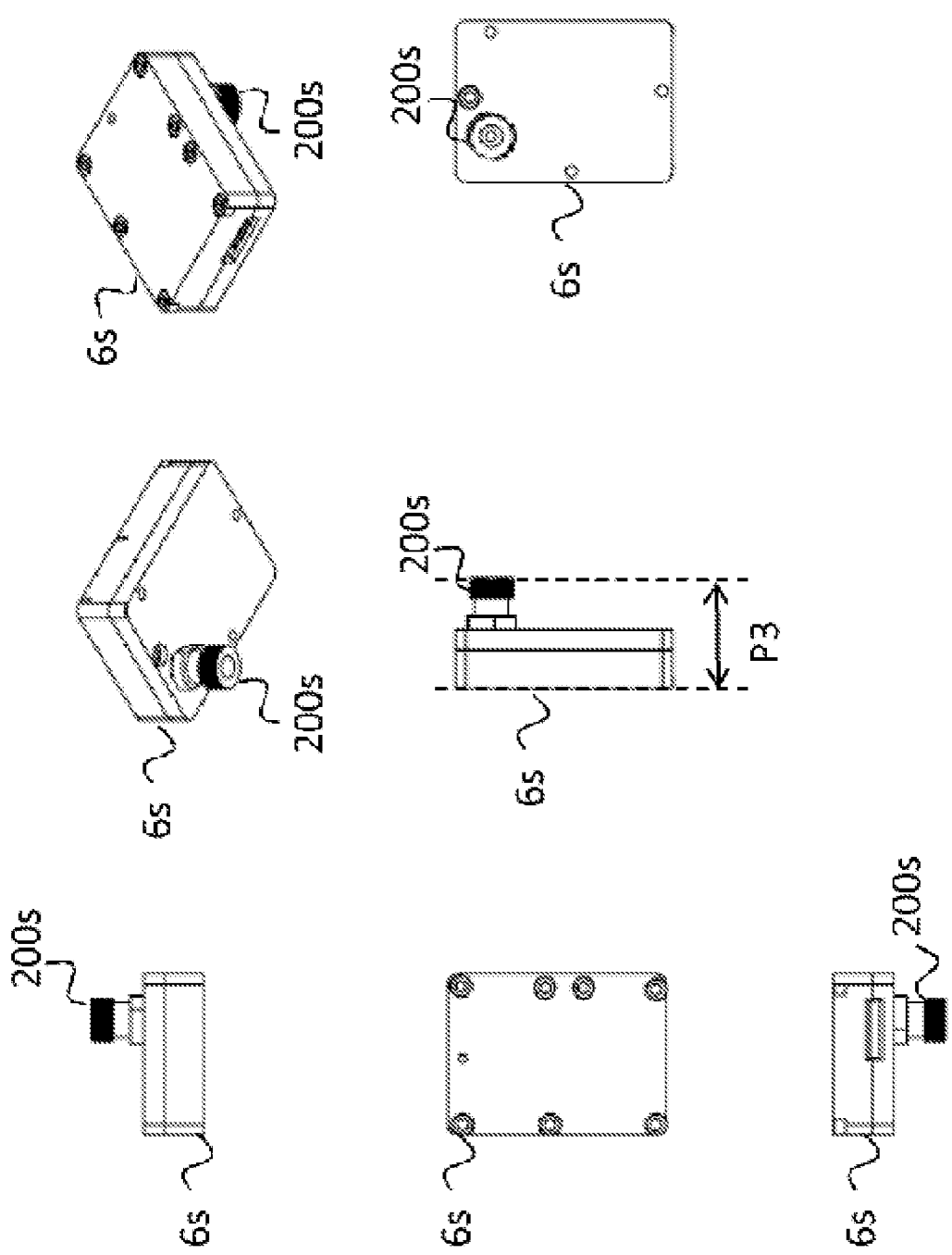
FIG. 9A is a set of schematic views showing the spectrometer of FIG. 8 equipped with an optical element viewed from different viewing angels.
Figure 9B:
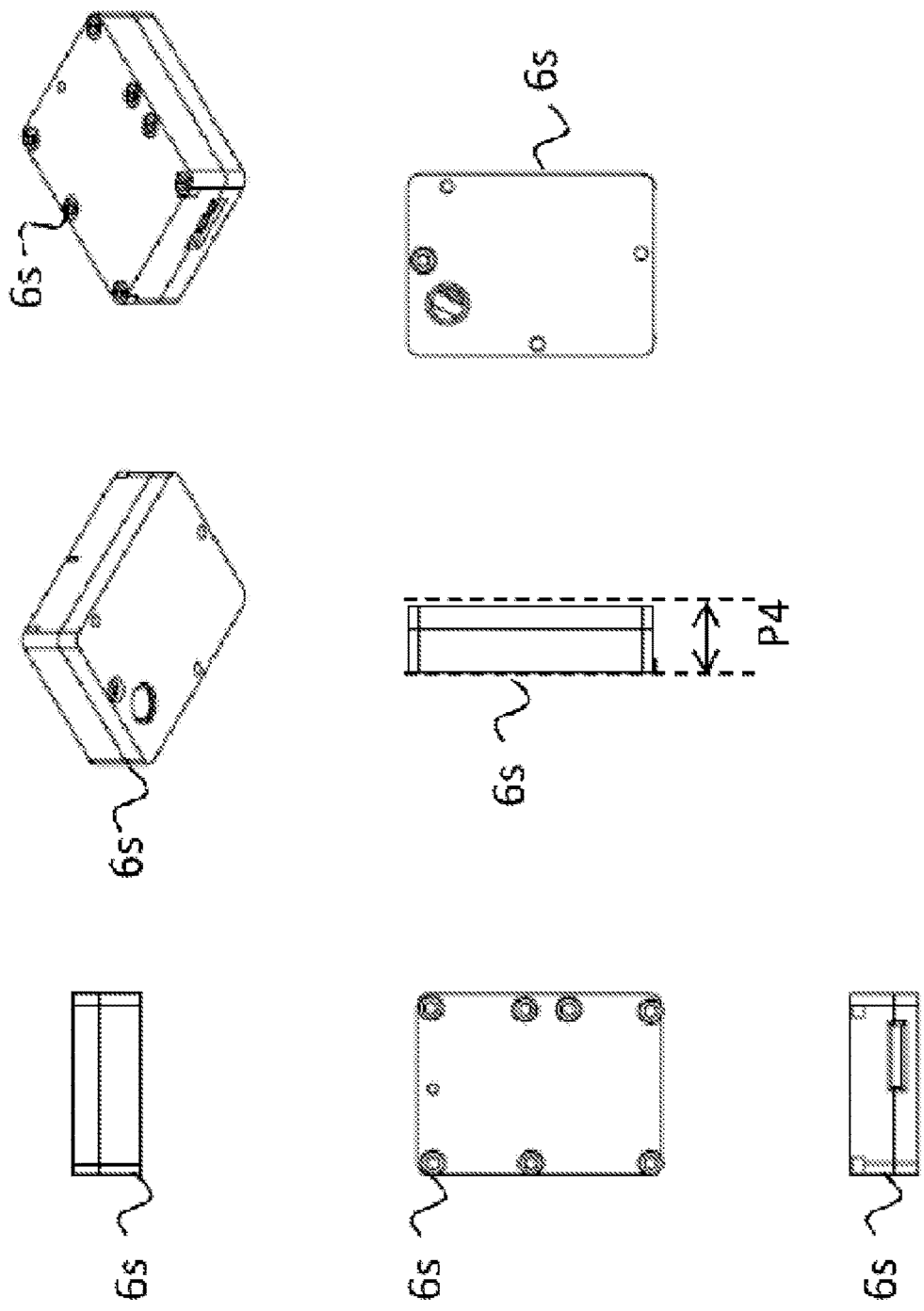
FIG. 9B is a set of schematic views showing the spectrometer of FIG. 8 without any optical element viewed from different viewing angles.

FIG. 8 is a schematic view showing a spectrometer equipped with a reflective element in accordance with further another embodiment of the present invention. FIG. 9A is a set of schematic views showing the spectrometer of FIG. 8 equipped with an optical element viewed from different viewing angels. FIG. 9B is a set of schematic views showing the spectrometer of FIG. 8 without any optical element viewed from different viewing angles. With reference to FIG. 8, FIG. 9A and FIG. 9B, in the current embodiment of the present invention, the spectrometer further comprises a reflective element 400s. The reflective element 400s is fixed in the housing and disposed between a through hole 3211s and a slit member 4s. After the light L1 passes through the through hole 3211s, the light L1 is reflected by the reflective element 400s toward the light incidence surface 43a of the slit member 4s, and then the light L1 exits from the light emergence surface 43b of the slit member 4s and enters a space between reflecting plates 12s. With reference to FIG. 8, an extending direction of the through hole 3211s is parallel to the light incidence surface 43a of the slit member 4s. In other words, the reflective element 400s reflects the light L1 for turning at a 90 degree angle. In an alternative embodiment, the reflective element 400s may be disposed at a different angle based on requirements.

In general, the spectrometer adopting an infrastructure of the optical waveguide member usually has a flat shape in appearance. In this embodiment, because of use of the reflective element 400s, the optical element 200s is allowed to be assembled at a flat side of the spectrometer. Compared with FIG. 7A, FIG. 9A shows that when the spectrometer equipped with the optical element 200s is integrated in a practical product, the product is required to reserve a configuration length P3 for placement of the spectrometer. The configuration length P3 is not only smaller than the configuration length P1, but also smaller than the configuration length P2. On this point, equipment of the reflective element 400s contributes to integration of the spectrometer with the practical products. When the practical product requires only the self function of the spectrometer, the optical element 200s can also be dismantled (as shown in FIG. 9B). In this case, the practical product only needs to reserve a configuration length P4 for placement of the spectrometer. As described, the configuration length P4 is smaller than the configuration length P3 so that it is easier for the spectrometer to be integrated in the practical products.

In sum, the central axis of the through hole is linked to the optical path defined by the optical waveguide member in the above described optical input portion so as to enable the light passing through the through hole to travel along the optical path and be incident to the dispersing element. Therefore, the optical input portion in accordance with the present invention has a function of receiving the light and allowing the light being incident to the dispersing element. In addition, the assembly structure formed on the hole wall of the through hole can be used to assemble the optical input portion with the optical element and to enable the optical axis of the optical element to link to the optical path. Therefore, the assembly structure enables the optical element to be precisely assembled with the optical input portion in order to avoid deviation of the optical axis, and to enhance or maintain accuracy of optical measurements. Furthermore, one of ordinary skill in the art is able to optionally adopt different types of the optical elements based on requirements for assembly thereof with the optical input portion in order to expand functions of the spectrometer. When the optical input portion is not assembled with the optical element, a self function of the spectrometer can be maintained and the spectrometer has a reduced volume, and integration of the spectrometer in practical products can be achieved conveniently.

In addition, based on contents of the embodiments described above, because the assembly structure can be made as the inner thread which is able to be engaged with the outer thread of the adaptor of the optical element, the optical element can be directly screwed with the optical input portion. Meanwhile, because the assembly structure and the through hole are coaxial, the optical axis of the optical element can be linked to the optical path defined by the optical waveguide member after the optical element is screwed with the through hole of the optical input portion. As a result, users can assemble the optical element with the spectrometer easily and precisely to facilitate users proceeding optical measurements.

Although only the preferred embodiments of the present invention are described as above, the practicing claim scope of the present invention is not limited to the disclosed embodiments. It is understood that any simple equivalent changes, adjustments or modifications to the present invention based on the following claims of the present invention and the content of the above invention description may be still covered within the claimed scope of the following claims of the present invention.

What is claimed is:

1. A spectrometer, comprising an optical waveguide member defining an optical path, a dispersing element disposed in the optical path, and an optical input portion having a through hole and an assembly structure formed on a hole wall of the through hole, wherein a light passes through the through hole and then travels along the optical path in order to be incident to the dispersing element, a plurality of spectral components are generated by the dispersing element from the light incident to the dispersing element, the assembly structure is used to be detachably assembled with an optical element, when the optical element is assembled with the assembly structure, an optical axis of the optical element is linked to the optical path so that a light to be measured passing through the optical element is incident to the dispersing element along the optical axis and the optical path;

wherein the optical waveguide member comprises two reflecting plates, each of the reflecting plates comprises a reflecting surface, the reflecting surfaces of the reflecting plates are arranged face to face, and a gap is formed between the reflecting surfaces, the optical path is located in the gap;

wherein the spectrometer further comprises a reflective element, the light passing through the through hole is reflected by the reflective element before the light further travels along the optical path to reach the dispersing element;

wherein a slit member is disposed between the optical input portion and the optical waveguide member, the slit member comprises a slit, a light incidence surface and a light emergence surface opposite to the light incidence surface, the slit extends from the light incidence surface to the light emergence surface, the reflective element is disposed between the optical input portion and the slit member, the light passing through the through hole is reflected by the reflective element to be incident to the light incidence surface, and then to exit from the light emergence surface; and wherein an extension direction of the through hole is parallel to the light incidence surface of the slit member.

2. The spectrometer as claimed in claim 1, wherein the through hole comprises a central axis and the assembly structure is coaxial with the through hole.

3. The spectrometer as claimed in claim 1, wherein the optical input portion comprises a first surface and a second surface opposite to the first surface, the through hole extends from the first surface to the second surface, the light enters the through hole from the first surface and leaves the through hole from the second surface, and then travels along the optical path, when the optical element is assembled with the assembly structure, the optical element is insertedly installed in the through hole from the first surface without protruding out of the second surface.

4. The spectrometer as claimed in claim 1, wherein the assembly structure is an inner thread, and the optical element is screwed and fixed in the through hole via the inner thread.

5. The spectrometer as claimed in claim 4, wherein a spiral trajectory is formed along the minimum inner radius of the inner thread, and a distance between one of any two points set at the spiral trajectory and a central axis of the through hole is same as a distance between the other of the any two points set at the spiral trajectory and the central axis.

6. The spectrometer as claimed in claim 1, further comprising a housing, wherein the optical waveguide member and the dispersing element are disposed inside the housing, and the through hole is exposed from an outer surface of the housing.

7. The spectrometer as claimed in claim 6, wherein the housing comprises a substrate and a cover assembled with the substrate, the optical input portion, the optical waveguide member and a diffraction grating are disposed and fixed on the substrate, during disassembly of the optical element from the assembly structure, the substrate and the cover remain assembled without detachment.

8. The spectrometer as claimed in claim 1, further comprising a decoration shell, wherein the optical waveguide member, the dispersing element and the optical input portion are all disposed in the decoration shell, the optical element comprises an adaptor used to be detachably assembled with the assembly structure, after the adaptor is assembled with the assembly structure, at least one portion of the adaptor is immerged in the optical input portion without protruding out of an outer surface of the decoration shell.

9. The spectrometer as claimed in claim 8, further comprising a sealing cap, wherein the decoration shell comprises an opening spatially communicable with the through hole, the sealing cap is installed in the opening and used to cover the through hole.

10. The spectrometer as claimed in claim 1, further comprising a slit member disposed between the optical input portion and the optical waveguide member, wherein the slit member comprises a slit, a light incidence surface and a light emergence surface opposite to the light incidence surface, the slit extends from the light incidence surface to the light emergence surface, the light is incident to the slit from the light incidence surface, and then exits from the light emergence surface, a size of the slit is varied to be gradually decreased from the light incidence surface to the light emergence surface.

11. The spectrometer as claimed in claim 10, wherein the slit comprises a plurality of sidewalls, an angle between any one of the plurality of sidewalls and the incidence surface of the slit member is greater than 90 degrees.

12. The spectrometer as claimed in claim 10, wherein an extension direction of the slit is perpendicular to the reflecting surface.

13. The spectrometer as claimed in claim 1, wherein the dispersing element is a reflective diffraction grating, and comprises a concave surface being a non-circular arc face and a diffraction structure formed on the concave surface.

14. The spectrometer as claimed in claim 1, further comprising an optical sensor used to receive the plurality of spectral components for spectral analysis.

15. An optical input portion of a spectrometer configured to be used for the spectrometer, wherein the spectrometer comprises an optical waveguide member and a dispersing element, the optical waveguide member defines an optical path, the optical input portion comprises an assembly structure formed on a hole wall of a through hole of the optical input portion, a light passes through the through hole and then travels along the optical path in order to be incident to the dispersing element for splitting the light, the assembly structure is used to be detachably assembled with an optical element, when the optical element is assembled with the assembly structure, an optical axis of the optical element is linked to the optical path so that a light to be tested passing through the optical element is incident to the dispersing element along the optical axis and the optical path;

wherein the optical waveguide member comprises two reflecting plates, each of the reflecting plates comprises a reflecting surface, the reflecting surfaces of the reflecting plates are arranged face to face, and a gap is formed between the reflecting surfaces, the optical path is located in the gap;

wherein the spectrometer further comprises a reflective element, the light passing through the through hole is reflected by the reflective element before the light further travels along the optical path to reach the dispersing element;

wherein a slit member is disposed between the optical input portion and the optical waveguide member, the slit member comprises a slit, a light incidence surface and a light emergence surface opposite to the light incidence surface, the slit extends from the light incidence surface to the light emergence surface, the reflective element is disposed between the optical input portion and the slit member, the light passing through the through hole is reflected by the reflective element to be incident to the light incidence surface, and then to exit from the light emergence surface; and wherein an extension direction of the through hole is parallel to the light incidence surface of the slit member.

16. The optical input portion of a spectrometer as claimed in claim 15, wherein the through hole comprises a central axis and the assembly structure is coaxial with the through hole.

17. The optical input portion of a spectrometer as claimed in claim 15, wherein the assembly structure is an inner thread, and the optical element is screwed and fixed in the through hole via the inner thread.

18. The optical input portion of a spectrometer as claimed in claim 17, wherein a spiral trajectory is formed along the minimum inner radius of the inner thread, and a distance between one of any two points set at the spiral trajectory and a central axis of the through hole is same as a distance between the other of any two points set at the spiral trajectory and the central axis.

19. The optical input portion of a spectrometer as claimed in claim 15, wherein the optical input portion comprises a first surface and a second surface opposite to the first surface, the through hole extends from the first surface to the second surface, the light enters the through hole from the first surface and leaves the through hole from the second surface, and then travels along the optical path, when the optical element is assembled with the assembly structure, the optical element is insertedly installed in the through hole from the first surface without protruding out of the second surface.

20. The optical input portion of a spectrometer as claimed in claim 19, wherein the optical element comprises an adaptor used to be detachably assembled with the assembly structure, after the adaptor is assembled with the assembly structure, at least one portion of the adaptor is immerged in the optical input portion.

\* \* \* \* \*